United States Patent
Cudak et al.

(10) Patent No.: US 11,112,852 B2
(45) Date of Patent: *Sep. 7, 2021

(54) MODIFICATION OF WHEN WORKLOADS ACCESS DATA UNITS AND/OR ON WHICH STORAGE DEVICES DATA UNITS ARE STORED TO CONSERVE POWER

(71) Applicant: Lenovo Enterprise Solutions (Singapore) PTE. LTD., New Tech Park (SG)

(72) Inventors: Gary David Cudak, Wake Forest, NC (US); John Scott Crowe, Durham, NC (US); Jennifer J. Lee-Baron, Morrisville, NC (US); Jason A. Matteson, Raleigh, NC (US); Nathan J. Peterson, Oxford, NC (US); Amy Leigh Rose, Chapel Hill, NC (US); Bryan L. Young, Tualatin, OR (US)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 318 days.

This patent is subject to a terminal disclaimer.

(21) Appl. No.: 16/201,022

(22) Filed: Nov. 27, 2018

(65) Prior Publication Data
US 2019/0094947 A1    Mar. 28, 2019

Related U.S. Application Data

(62) Division of application No. 15/232,103, filed on Aug. 9, 2016, now Pat. No. 10,168,763.

(51) Int. Cl.
*G06F 1/32* (2019.01)
*G06F 3/06* (2006.01)
(Continued)

(52) U.S. Cl.
CPC ............ *G06F 1/3287* (2013.01); *G06F 1/325* (2013.01); *G06F 1/329* (2013.01); *G06F 1/3228* (2013.01);
(Continued)

(58) Field of Classification Search
None
See application file for complete search history.

(56) References Cited

U.S. PATENT DOCUMENTS 8,452,819 B1    5/2013  Sorenson, III et al.
8,626,902 B2 *  1/2014  Singh .................... G06F 1/3206
                                                       709/224

(Continued)

OTHER PUBLICATIONS

Lin et al., "Energy-efficient Virtual Machine Provision Algorithms for Cloud Systems", 2011 Fourth IEEE International Conference on Utility and Cloud Computing, pp. 81-88.

(Continued)

*Primary Examiner* — Tanh Q Nguyen
(74) *Attorney, Agent, or Firm* — Kunzler Bean & Adamson; Bruce R. Needham

(57) ABSTRACT

A system includes storage devices storing data units. Each data unit is stored on one of the storage devices. The system includes a processor, and a non-transitory computer-readable data storage medium storing computer-executable code. The processor executes the code to correlate workloads to the data units with respect to which of the workloads access which of the data units, and when the workloads access the data units. The processor executes the code to when the workloads access the data units and/or and on which of the storage devices the data units are stored, so that at given times the data units stored on a subset of the storage devices are not being accessed by any workload. The processor executes the code to, during each given time, power off the (Continued)

subset of the storage devices storing the data units that are not being accessed by any workload to conserve power.

20 Claims, 5 Drawing Sheets

(51) Int. Cl.
  *G06F 1/3287*  (2019.01)
  *G06F 1/3234*  (2019.01)
  *G06F 1/329*  (2019.01)
  *G06F 1/3228*  (2019.01)
  *G06F 9/48*  (2006.01)

(52) U.S. Cl.
  CPC .......... *G06F 1/3256* (2013.01); *G06F 1/3268* (2013.01); *G06F 3/067* (2013.01); *G06F 3/0625* (2013.01); *G06F 3/0634* (2013.01); *G06F 3/0647* (2013.01); *G06F 3/0683* (2013.01); *G06F 9/4893* (2013.01); *Y02D 10/00* (2018.01)

(56) References Cited

U.S. PATENT DOCUMENTS

| | | |
|---|---|---|
| 8,935,500 B1 | 1/2015 | Gulati et al. |
| 9,711,232 B2 | 7/2017 | Choi et al. |
| 10,168,763 B2 * | 1/2019 | Cudak .................. G06F 3/0683 |
| 2011/0072208 A1 | 3/2011 | Gulati et al. |
| 2011/0213994 A1 * | 9/2011 | Thereska .............. G06F 1/3221 |
| | | 713/320 |
| 2013/0198468 A1 | 8/2013 | Antony et al. |
| 2015/0347430 A1 * | 12/2015 | Ghosh ................ G06F 11/1451 |
| | | 707/649 |
| 2016/0065492 A1 | 3/2016 | Hu et al. |
| 2018/0046243 A1 | 2/2018 | Cudak et al. |
| 2019/0094947 A1 * | 3/2019 | Cudak ..................... G06F 1/329 |

OTHER PUBLICATIONS

Raghavendra et al., "No "Power" Struggles: Coordinated Multi-level Power Management for the Data Center", ASPLOS'08, Mar. 1-5, 2008, Seattle, Washington, 2008 ACM, 47 pp.

Berral, et al., "Towards energy-aware scheduling in data centers using machine learning", Energy-Efficient Distributed Computing Systems, John Wiley & Sons, Inc., Hoboken, NJ, 2012, 10 pp.

Yan et al., "Toward Automating Work Consolidation with Performance Guarantees in Storage Clusters", 2011 IEEE 19th Annual International Symposium on Modelling, Analysis, and Simulation of Computer and Telecommunication Systems, Jul. 25-27, 2011; pp. 326-335.

Oh et al., "Enabling consolidation and scaling down to provide power management for cloud computing", Proceedings of the 3rd USENIX Conference on Hot Topics In Cloud Computing, Berkeley, CA, 2011, 5 pp.

\* cited by examiner

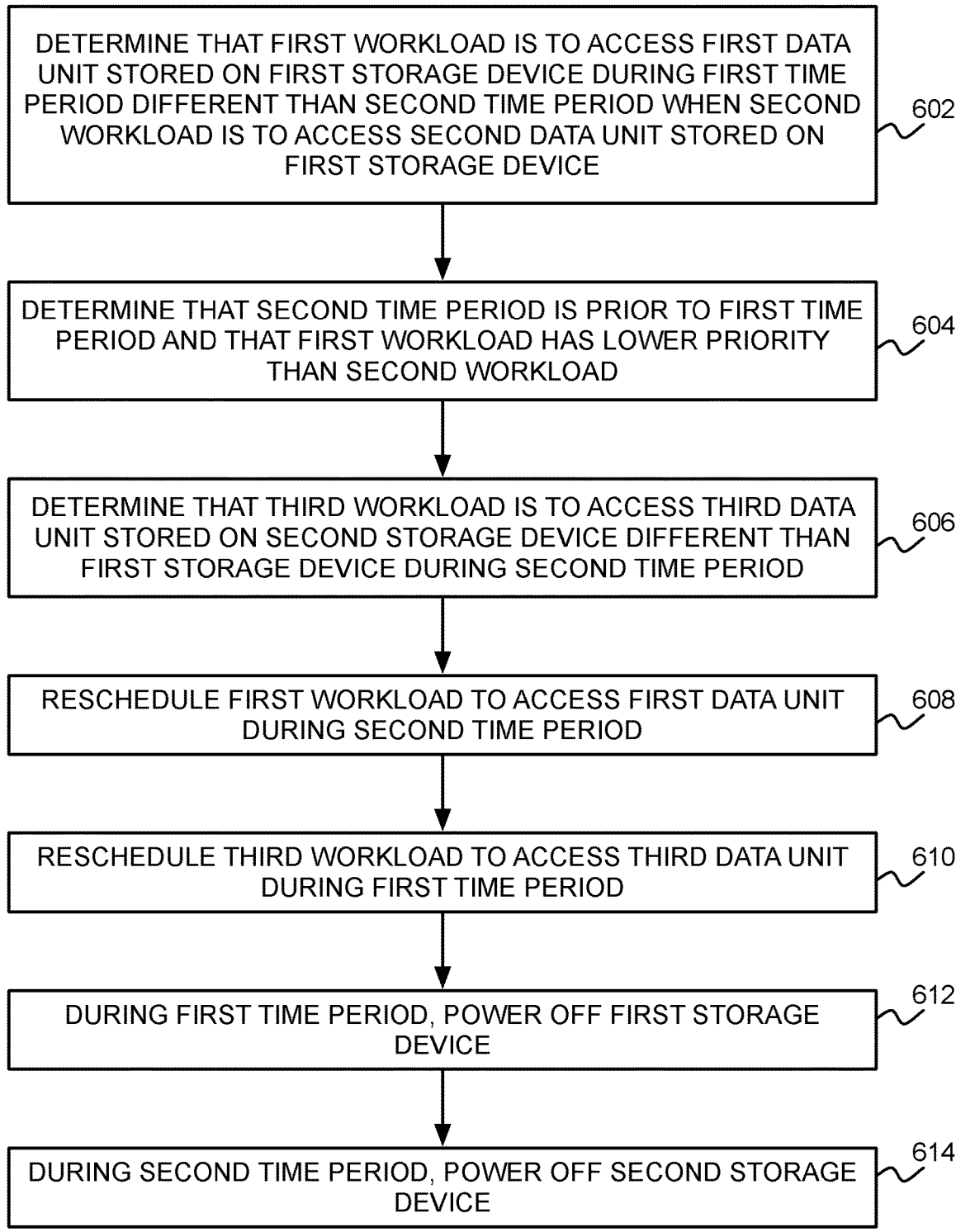

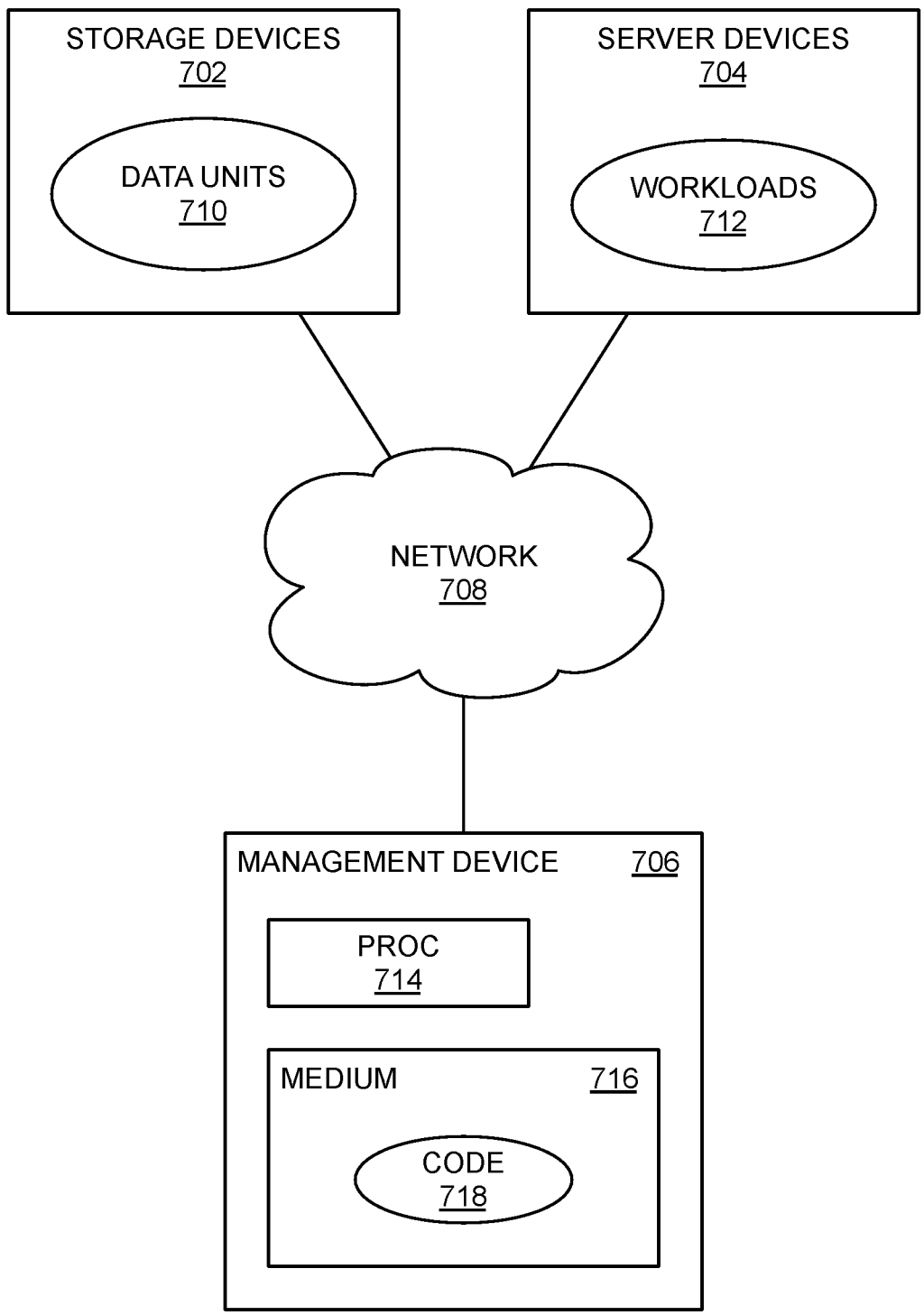

MODIFICATION OF WHEN WORKLOADS ACCESS DATA UNITS AND/OR ON WHICH STORAGE DEVICES DATA UNITS ARE STORED TO CONSERVE POWER

BACKGROUND

In large-scale computing environments such as enterprise computing environments and cloud computing environments, computing devices like server can be assigned workloads to perform. A workload can be defined as a discrete amount of processing work that a computing device is to perform. The computing devices that perform the workloads are commonly separate from the devices that store the data in relation to which the workloads are executed. For example, storage devices, including hard disk drives, solid-state drives (SSDs), and storage arrays may store the data on which the workloads are operable. Therefore, when a computing device executes a workload, the computing device accesses the storage device that stores the data to which the workload pertains.

SUMMARY

An example system includes storage devices on which data units are stored. Each data unit is stored on one of the storage devices. The system includes a processor, and a non-transitory computer-readable data storage medium storing computer-executable code executable by the processor. The code is executable by the processor to correlate workloads to the data units with respect to which of the workloads access which of the data units, and when the workloads access the data units. The code is executable by the processor to modify one or more of when the workloads access the data units, and on which of the storage devices the data units are stored, so that at given times the data units stored on a subset of the storage devices are not being accessed by any workload. The code is executable by the processor to, during each given time, power off the subset of the storage devices storing the data units that are not being accessed by any workload to conserve power.

An example method includes determining, by a computing device, that a first data unit stored on a first storage device is scheduled for access by a first workload during a same time period as a second data unit stored on a second storage device is scheduled for access by a second workload. The method includes moving, by the computing device, the first data unit from the first storage device to the second storage device. The method includes, during the same time period, powering off, by the computing device, the first storage device, to conserve power.

An example non-transitory computer-readable data storage medium stores computer-executable code that a processor executes. The processor executes the code to determine that a first workload is to access a first data unit stored on a storage device during a first time period different than a second time period when a second workload is to access a second data unit stored on the storage device. The processor executes the code to reschedule the first workload to access the first data unit stored on the storage device during the second time period so that the first workload is to access the storage device during a same time period as the second workload is to access the storage device. The processor executes the code to, during the first time period, power off the storage device to conserve power.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 6 is a flowchart of an example method of the technique for realizing power conservation by modifying when data units stored on storage devices are accessed.

FIG. 7 is a diagram of an example system in which techniques for realizing power conservation by modifying which storage devices store data units and/or by modifying when data units stored on storage devices are accessed are performed.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, in large-scale computing environments, computing devices like servers are assigned workloads to perform, which are discrete amounts of processing work. The workloads operate on data that storage devices separate from the computing devices store. A given computing environment can include hundreds, thousands, or even more devices, including storage devices storing the data to which workloads pertain. The power requirements for running such devices can be quite large, and thus quite expensive, particularly when all the devices of a large-scale computing environment are powered on.

Workloads are generally scheduled for execution on a currently available computing device within quality-of-service (QoS) constraints. To decrease operational expense in operating a large-scale computing environment, conventional focus has been placed on maintaining power to the number of computing devices, like servers, that are likely needed to execute scheduled workloads. When fewer workloads are scheduled to be executed, computing devices that are not needed may be powered off, and then powered back on automatically shortly before there is an anticipated increase in the number of workloads to be processed. As such, existing power conservation techniques focus on the computing devices, such as servers, that execute the workloads.

Disclosed herein are techniques that instead focus on the storage devices that store the data upon which the workloads operate. Workloads are correlated to data units, with respect both to which workloads access which data units, and to when the workloads are scheduled to access the data units. A data unit may be a complete data file, or may be an individual data block of a data file. When the workloads access the data units, and/or on which storage devices the data units are stored, is modified so that at given times a subset of storage devices is not accessed by any workload. During these given times, the subset of storage devices can be powered off to conserve power.

Figure 1:
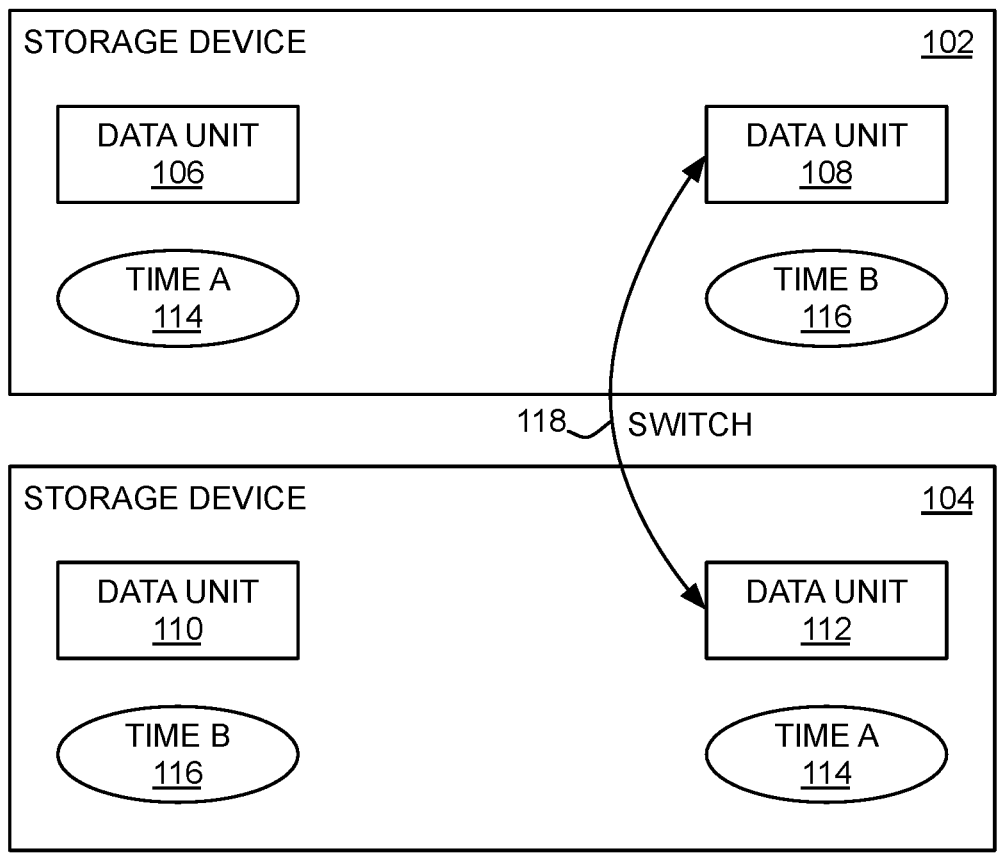
FIG. 1 is a diagram illustratively depicting an example of a technique for realizing power conservation by modifying which storage devices store data units.

FIG. 1 illustratively depicts an example of a technique for realizing power conservation by modifying which storage devices store data units. There are two separate storage devices 102 and 104. The storage device 102 stores data units 106 and 108, and the storage device 104 stores data units 110 and 112. The data units 106 and 112 are accessed by one or more workloads during time period 114, whereas the data units 108 and 110 are accessed by the same or different workloads during time period 116 that is different than time period 114. Therefore, during time period 114, when workloads are accessing the data units 106 and 112, both storage devices 102 and 104 have to remain powered on, because the data unit 106 is stored on the storage device 102 and the data unit 112 is stored on the storage device 104. Likewise, during time period 116, when the same or different workloads are accessing the data units 108 and 110, both storage devices 102 still have to remain powered on, because the data unit 108 is stored on the storage device 102 and the data unit 110 is stored on the storage device 104.

In the example of FIG. 1, then, the data unit 108 is moved from the storage device 102 to the storage device 104, and/or the data unit 112 is moved from the storage device 104 to the storage device 102. Assuming both the data units 108 and 112 are moved, as indicated by the arrow 118, then during time period 114, when workloads are accessing the data units 106 and 112, the storage device 104 can be powered off, because no workloads are accessing the data units 108 and 110 that are now stored on the storage device 104. Similarly, during time period 116, when workloads are accessing the data units 108 and 110, the storage device 102 can be powered off, because no workloads are accessing the data units 106 and 112 that are now stored on the storage device 102.

The time periods 114 and 116 may overlap or may not overlap. For example, time period 114 may be between times t1 and t2, and time period 116 may be between times t2 and t3, where t1<t2<t3, such that the time periods 114 and 116 do not overlap but are adjacent to one another. As another example, time period 114 may be between times t1 and t3, and time period 116 may be between times t2 and t4, where t1<t2<t3<t4, such that the time periods 114 and 116 overlap one another. Therefore, between times t1 and t2 the storage device 104 is powered off, because workloads access the data units 108 and 110 stored on the storage device 104 between times t2 and t4. Similarly, between times t3 and t4, the storage device 102 is powered off, because workloads access the data units 106 and 112 stored on the storage device between times t1 and t3.

In the technique of which FIG. 1 is an example, just where the data units 106, 108, 110, and 112 are stored—that is, on which storage device 102 or 104 each of the data units 106, 108, 110, and 112 is stored—may be modified. When workloads access the data units 106, 108, 110, and 112, does not have to be modified. That is, that workloads are scheduled to access the data units 106 and 112 during the time period 114 and that workloads are scheduled to access the data units 108 and 110 during the time period 116 may not be modified.

Figure 2:
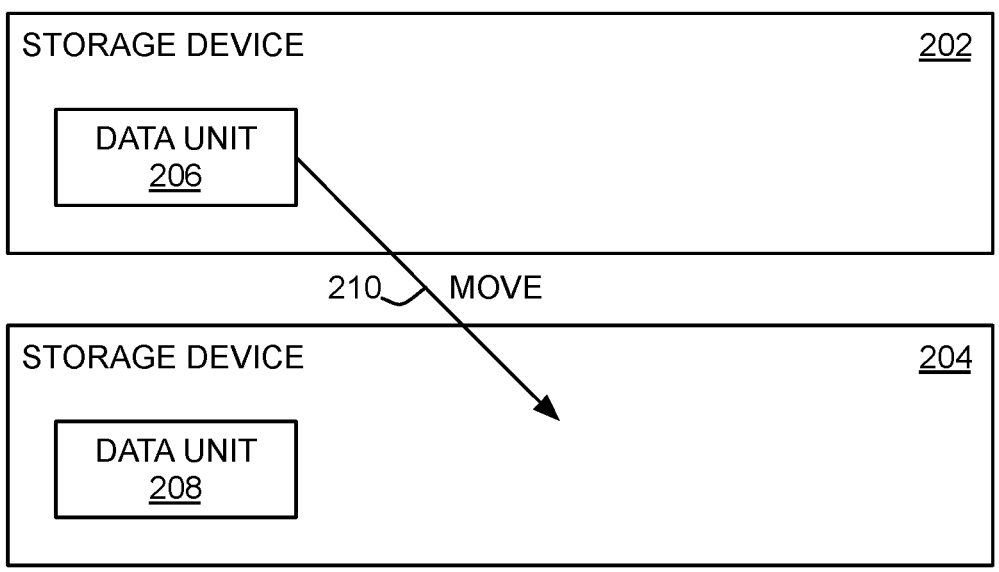
FIG. 2 is a diagram illustratively depicting another example of the technique for realizing power conservation by modifying which storage devices store data units.

FIG. 2 illustratively depicts another example of the technique for realizing power conservation by modifying which storage devices store data units. There are two separate storage devices 202 and 204. The storage device 202 stores a data unit 206, and the storage device 204 stores a data unit 208. Workloads may access the data units 206 and 208 during the same time periods, such as constantly as one example. Therefore, both storage devices 202 and 204 have to remain powered on. In the example of FIG. 2, then, the data unit 206 is moved from the storage device 202 to the storage device 204. The data unit 208 remains on the storage device 204. The storage device 202 can then be powered off, such as indefinitely.

The decision to move the data unit 206 from the storage device 202 to the storage device 204 instead of moving the data unit 208 from the storage device 204 to the storage device 202 (such that the storage device 204 would then be powered off), can be based on relative power efficiencies of the two storage devices 202 and 204. For example, the storage device 202 may consume more power than the storage device 204 when powered on, such that turning off the storage device 202 instead of the storage device 204 results in greater power conservation. The storage device 202 may be a solid-state drive (SSD), for instance, whereas the storage device 204 may be an array of hard disk drives, which typically require more power than an SSD.

Figure 3:
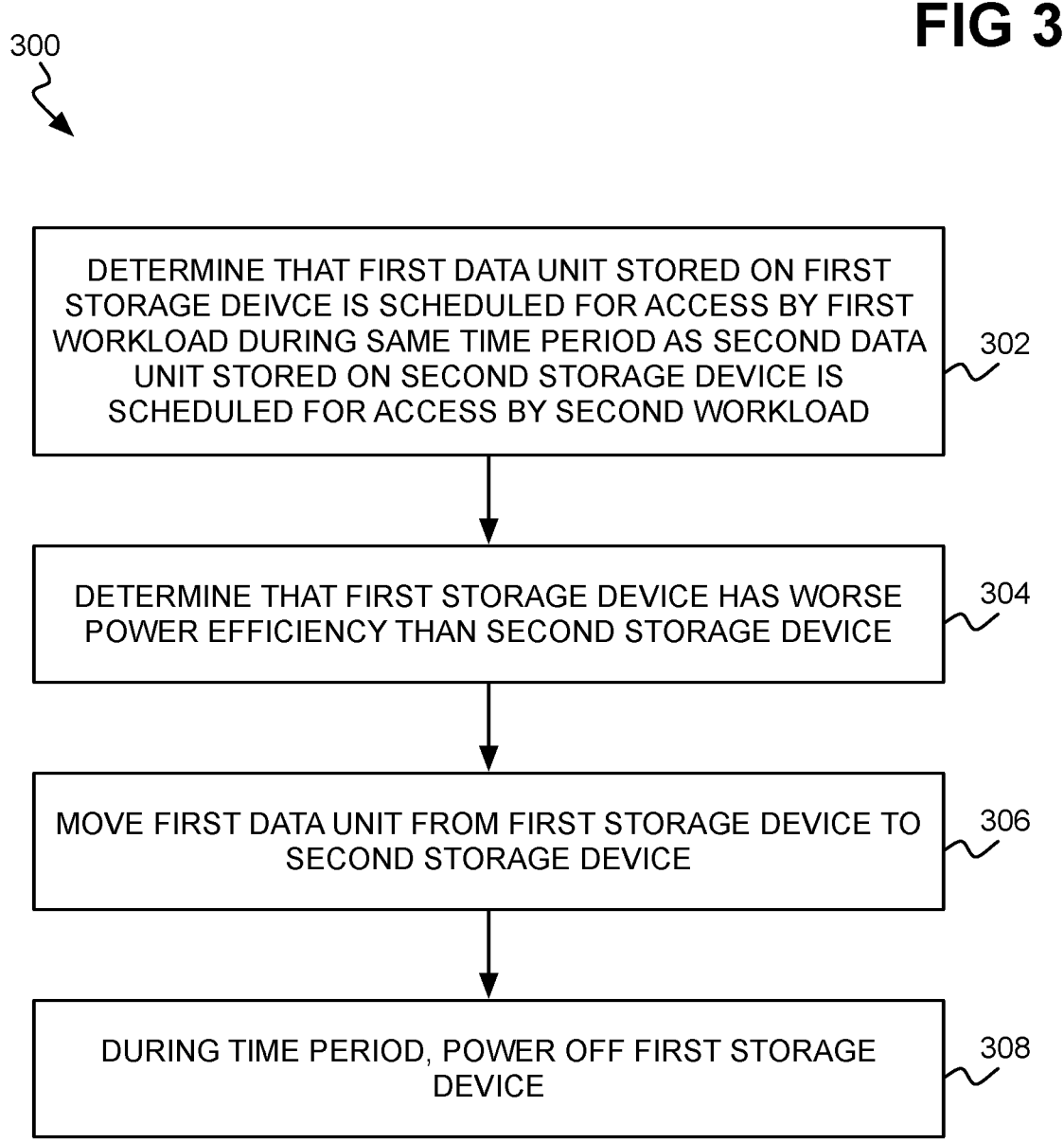
FIG. 3 is a flowchart of an example method of the technique for realizing power conservation by modifying which storage devices store data units.

FIG. 3 shows a method 300 to realize the technique that has been described in relation to FIGS. 1 and 2. The method 300 can be performed by a computing device. The computing device determines that a first data unit stored on a first storage device is scheduled for access by a first workload during the same time period as a second data unit stored on a second storage device is scheduled for access by a second workload (302). The computing device may also determine that the first storage device has worse power efficiency than the second storage device (304). For example, the first storage device consumes more power when powered on than the second storage device.

The computing device therefore in response moves the first data unit from the first storage device to the second storage device (306). As such, during the time period in question when the first and second data units are accessed, the computing device powers off the first storage device (308) to conserve power. The first data unit is moved to the second storage device as opposed to the second data unit being moved to the first storage device as a result of the determination made in part 304, to maximally conserve power.

As to the example that has been described in relation to FIG. 1, parts 302, 306, and 308 can be performed twice. The first time parts 302, 306, and 308 are performed for data units 112 and 106 (as the first and second data units), resulting in the data unit 112 being moved from the storage device 104 (as the first storage device) to the storage device 102 (as the second storage device). The second time parts 302, 306, and 308 are performed for data units 108 and 110 (as the first and second data units), resulting in the data unit 108 being moved from the storage device 102 (as the first storage device) to the storage device 104 (as the second storage device).

As to the example that has been described in relation to FIG. 2, parts 302, 304, 306, and 308 can be performed once. In part 304, for instance, the computing device determines that the storage device 202 has worse power efficiency than the storage device 204. This is why in part 306 the data unit 206 is moved from the storage device 202 to the storage device 204, instead of the data unit 208 being moved from the storage device 204 to the storage device 202.

Figure 4:
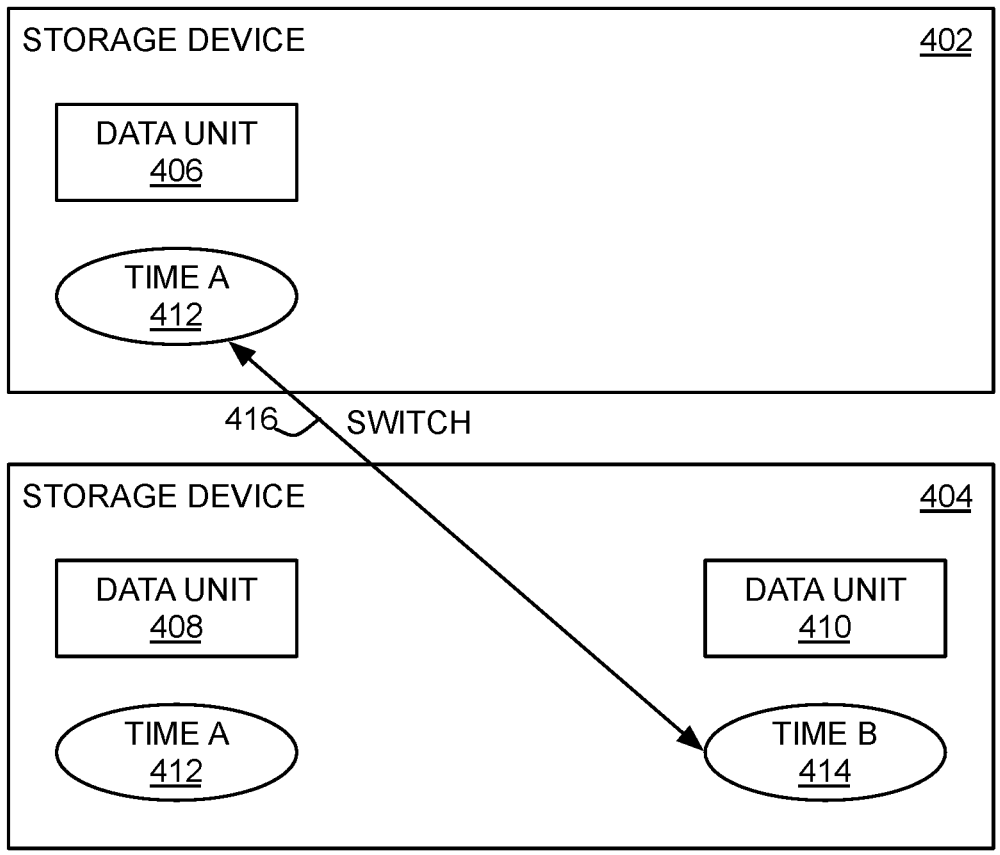
FIG. 4 is a diagram illustratively depicting an example of a technique for realizing power conservation by modifying when data units stored on storage devices are accessed.

FIG. 4 illustratively depicts an example of another technique for realizing power conservation, by modifying when workloads access data units stored on storage devices. There are two separate storage devices 402 and 404. The storage device 402 stores the data unit 406, and the storage device 404 stores data units 408 and 410. The data units 406 and 408 are accessed by the same workload or different workloads during time period 412, whereas the data unit 410 is accessed by the same workload(s) that access the data units 406 and/or 408 or by a different workload during time period 414. Therefore, during time period 412, when one or more workloads are accessing the data units 406 and 408, both storage devices 402 and 404 have to remain powered on, because the data unit 406 is stored on the storage device 402 and the data unit 408 is stored on the storage device 404.

In the example of FIG. 4, then, when the data units 406 and 410 are each accessed is switched (416). That is, the data unit 406 is accessed by one or more workloads during the time period 414 instead of during the time period 412, and the data unit 410 is accessed by the same or different one or more workloads during the time period 412 instead of during the time period 414. During time period 412, when the data units 408 and 410 are being accessed, the storage device 402 can be powered off. Similarly, during time period 414, when the data unit 406 is being accessed, the storage device 404 can be powered off.

The time periods 412 and 414 may overlap or may not overlap. For example, time period 412 may be between times t1 and t2, and time period 414 may be between times t2 and t3, where t1<t2<t3, such that the time periods 412 and 414 do not overlap but are adjacent to one another. As another example, time period 412 may be between times t1 and t3, and time period 414 may be between times t2 and t4, where t1<t2<t3<t4, such that time periods 412 and 514 overlap one another. Therefore, between times t1 and t2 the storage device 404 is powered off, because the data units 408 and 410 stored on the storage device 404 are accessed between times t2 and t4. Similarly, between times t3 and t4, the storage device 402 is powered off, because the data unit 406 stored on the storage device 402 is accessed between times t1 and t3.

In the technique of which FIG. 4 is an example, just when the data units 406, 408, and 410 are accessed may be modified. Where the data units 406, 408, and 410 are stored—that is, on which storage device 402 and 404 each of the data units 406, 408, and 410 is stored—does not have to be modified. That is, that the data unit 406 is stored on the storage device 402 and that the data units 408 and 410 are stored on the storage device 404 may not be modified.

Figure 5:
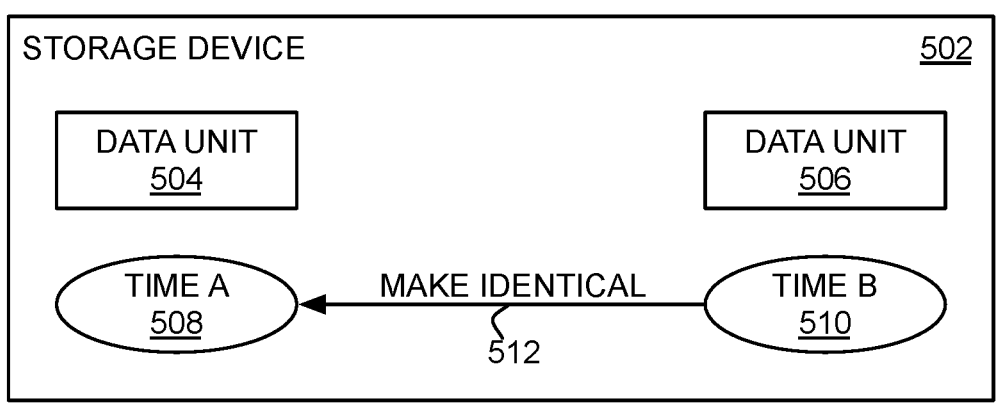
FIG. 5 is a diagram illustratively depicting another technique of the technique for realizing power conservation by modifying when data units stored on storage devices are accessed.

FIG. 5 illustratively depicts another example of the technique for realizing power conservation by modifying when data units stored on storage devices are accessed by the same or different workloads. There is one storage device 502. The storage device 502 stores two data units 504 and 506. A workload may access the data unit 504 during time period 508, whereas the same or different workload may access the data unit 506 during a different time period 510. Therefore, the storage device 502 has to remain powered on during both time periods 508 and 510. In the example of FIG. 5, then, the time period at which the data unit 506 is accessed is moved from the time period 510 to the same time period 508 when the data unit 504 is accessed. The storage device 502 can then be powered off during time period 510, since both data units 504 and 506 are accessed during the same time period 508.

The decision to change the time period when the data unit 506 is accessed to the same time period 508 when the data unit 504 is accessed instead of changing the time period when the data unit 504 is accessed to the same time period 510 when the data unit 504 is accessed can be based on which time period 508 or 510 occurs first, and/or, if different workloads are accessing the data units 504 and 506, which workload has higher priority. For example, the workload accessing the data unit 504 may have higher priority than the data unit 506, and the time period 508 may occur prior to the time period 510. Therefore, changing the time period when the data unit 504 is accessed to the time period 510 when the data unit 506 is accessed may be unacceptable, because the workload accessing the data unit 504 has higher priority and its execution should not be delayed for power conservation purposes. By comparison, changing the time period when the data unit 506 is accessed to the time period 508 when the data unit 504 is accessible, assuming that processing both the workload accessing the data unit 504 and the workload accessing the data unit 506 at the same time does not impair the quality of service (QoS) of the higher priority workload accessing the data unit 504.

FIG. 6 shows a method 600 to realize the technique that has been described in relation to FIGS. 4 and 5. The method 600 can be performed by a computing device. The computing device determines that a first workload is to access a first data unit stored on a first storage device during a first time period that is different than a second time period when a second workload is to access a second data unit stored on the first storage device (602). The first and second workloads may be the same workload, or they may be different workloads.

The computing device can determine that the second time period is prior to the first time period and/or that the first workload has lower priority than the second workload (604). The computing device can also determine that a third workload is to access a third data unit stored on a second storage device different than the first storage device during the second time period (606). The third workload may be the same workload as the first and/or second workload, or may be a different workload.

The computing device therefore in response to parts 602 and 604 can reschedule the first workload to access the first data unit during the second time period when the second workload accesses the second data unit (608). The computing device in response to parts 602 and 606 can reschedule the third workload to access the third data unit during the first time period (610). As such, during the first time period, the first storage device can be powered off to conserve power (612), and during the second time period, the second storage device can be powered off to conserve power (614).

As to the example that has been described in relation to FIG. 4, parts 602, 606, 608, 610, 612, and 614 can be performed. The first, second, and third data units are the data units 410, 408, and 406, respectively. The first and second storage devices are the storage devices 404 and 402, respectively. The first and second time periods are the time periods 414 and 412, respectively. As such, in part 608 the workload (s) accessing the data unit 410 are rescheduled to access the data unit 410 during the time period 412 when the (higher priority) workload(s) are access the data unit 408. Similarly, in part 610 the workload(s) are rescheduled to access the data unit 406 during the time period 414.

As to the example that has been described in relation to FIG. 5, parts 602, 604, 608, and 612 can be performed. The first and second data units are the data units 506 and 504, respectively. The first storage device is the storage device 502. The first and second time periods are the time periods 510 and 508, respectively. As such, in part 608 the workload(s) accessing the data unit 506 are rescheduled to access the data unit 506 during the time period 508 when the (higher priority) workload(s) are accessing the data unit 504.

FIG. 7 shows an example system 700 that can realize either or both of the techniques of FIGS. 1-3 and the techniques of FIGS. 4-6 that have been described. The system 700 can include one or more storage devices 702, one or more server devices 704, and a management device 706. The devices 702, 704, and 706 are communicatively connected to one another over a network 708, which may be or include a local-area network (LAN), a wide-area network (WAN), an intranet, an extranet, the Internet, as well as other types of networks.

The storage devices 702 store data units 710. Each data unit 710 is stored on one of the storage devices 702 in one implementation. Each data unit 710 can be a separate data file, or it can be a data block of a data file. In the latter case, a data file includes multiple data blocks. The data blocks of a data file may be stored on the same storage device 702, or they may be stored over a number of the storage devices 702. Examples of storage devices 702 including individual hard disk drives, individual SSDs, as well as arrays of hard disk drives, arrays of SSDs, and arrays of hard disk drives and SSDs. Another example of a storage device 702 is a storage-area network (SAN).

The server devices 704 are scheduled to execute workloads 712. Each workload 712 pertains to one or more data units 710. More than one workload 712 may pertain to the same data unit 710. When a server device 704 executes a workload 712, the server device 704 thus executes the workload 712 in relation to the data unit(s) 710 to which the workload 712 in question pertains. The server devices 704 are more generally computing devices, such as computers.

The management device 706 is also more generally a computing device like a computer. The management device 706 includes at least a processor 714 and a non-transitory computer-readable data storage medium 716 storing computer-executable code 718. The processor 714 executes the code 718 to realize the power conservation technique of FIGS. 1-3, and/or the power conservation technique of FIGS. 4-6.

The management device 706 thus correlates the workloads 712 to the data units 710 with respect to which of the workloads 712 access which of the data units 710, and when the workloads 712 access the data units 710. The management device 706 may be responsible for scheduling when the server devices 704 execute their workloads 712, such that the management device 706 itself may track when the workloads 712 access the data units 710 and which data units 710 each workload 712 accesses. The management device 706 may also query each server device 704 to learn which workloads 712 are assigned to the server device 704 and when the server device 704 is to execute the workloads 712. The management device 706 may further query the storage devices 702 to determine which storage devices 702 store which data units 710.

The management device 706 modifies which of the storage devices 702 store which of the data units 710 per the technique of FIGS. 1-3 and/or when the workloads 712 access the data units 710 per the technique of FIGS. 4-6. As such, at given times the data units 710 stored on a subset of the storage devices 702 will not be accessed by any workload. During each such time, the management device 706 powers off the subset of the storage devices 702 in question to conserve power. The management device 706 may at the beginning of a corresponding time period instruct storage devices 702 to turn off, and then at the conclusion of the time period instruct the storage devices 702 to turn on. The management device 706 may further schedule the storage devices 702 ahead of time to turn off and back on when no workloads stored thereon will be accessed by any workload 712.

The management device 706 may implement just the technique of FIGS. 1-3, and not the technique of FIGS. 4-6. As such, the management device 706 modifies just on which storage devices 702 the data units 710 are stored, without changing when the workloads 712 access the data units 710. Such modification can entail migrating the data units 710 among the storage devices 702 so that the data units accessed by the workloads 712 during a same time period are stored on the same storage device 702, as has been described above in relation to FIGS. 1-3.

Such modification of which storage devices 702 store which data units 710 can further entail taking into account differences in power efficiency among the storage devices 702, so that the storage devices 702 that are least power efficient are maximally powered off. As one example, if the time periods in which the data units 710 are accessed are all equal in length of time, then the management device 706 may migrate the data units 710 among the storage devices 702 so that the storage devices 702 that are least power efficient store data units 710 that are accessed by workloads 712 in the fewest time periods. As another example, if the time periods in which the data units 710 are unequal, then the management device 706 may migrate the data units 710 among the storage devices 702 so that the storage devices 702 that are least power efficient are powered off for the longest lengths of time.

The management device 706 may modify which storage devices 702 store which data units 710 to realize the maximum power conservation possible, regardless of the number of data units 710 that have to be migrated among the storage devices 702. The management device 706 may modify which storage device 702 store which data units 702 to instead minimize the number of data units 710 that have to be migrated among the storage devices 702, even if maximum power conservation will not be realized. The latter approach may take less time to perform than the former approach, for instance. The management device 706 may perform an interim approach as well, such as migrating up to a predetermined number of data units 710 among the storage devices 702, or migrating enough data units 710 to realize a desired level of power conservation.

The management device 706 may instead implement just the technique of FIGS. 4-6, and not the technique of FIGS. 1-3. As such, the management device 706 modifies just when the workloads 712 access the data units 710, without moving any data unit 710 from the storage device 702 on which it is currently stored. Such modification can entail scheduling execution of the workloads 712 so that the workloads 712 accessing the data units 710 stored on the same storage device 702 are executed during the same time period, as has been described above in relation to FIGS. 4-6. Such modification can further entail taking into the priorities of the workloads 712 as well, to ensure, for instance, that workloads 712 that have higher priority remain scheduled for execution before workloads 712 with lower priority.

The management device 706 may modify when the workloads 712 access the data units 710 to realize the maximum power conservation possible, regardless of the extent to which execution of the workloads 712 has to be reordered. The management device 706 may instead modify when the workloads 712 access the data units 710 to minimize the extent to which execution of the workloads 712 have to be reordered, even if maximum power conservation is not achieved. The latter approach may require less processing than the former approach, for instance. The management device 706 may perform an interim approach as well, such as changing the time of execution of up to a predetermined number of workloads 712, or changing the time of execution of enough workloads to realize a desired level of power conservation.

The techniques that have been described herein provide for storage device-centric power conservation. That is, the techniques permit storage devices to be powered off when the data units they store are not being accessed by workloads. To achieve such power conservation, the data units themselves can be migrated among the storage devices, and/or when the workloads access the data units can be modified. These techniques may complement server device-centric power conservation techniques, in which server devices are also selectively powered off at times when they are not being actively used.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   correlating a plurality of workloads to a plurality of data units by correlating which of the workloads access which of the data units and determining when each workload accesses a data unit of the plurality of data units, wherein the data units are stored on a plurality of storage devices, each data unit stored on one of the storage devices, wherein a data unit is one of a data file and a data block of a data file;
   modifying one or more of when the workloads access the data units, and on which of the storage devices the data units are stored, so that at given times the data units stored on a sub-plurality of the storage devices are not being accessed by any workload; and
   during each given time, powering off the sub-plurality of the storage devices storing the data units that are not being accessed by any workload to conserve power.

2. The method of claim 1:
   wherein correlating the plurality of workloads to the data units by correlating which of the workloads access which of the data units and determining when each workload accesses a data unit of the plurality of data units comprises determining that a first data unit stored on a first storage device is scheduled for access by a first workload during a same time period as a second data unit stored on a second storage device is scheduled for access by a second workload;
   wherein modifying one or more of when the workloads access the data units, and on which of the storage devices the data units are stored, so that at given times the data units stored on a sub-plurality of the storage devices are not being accessed by any workload comprises moving the first data unit from the first storage device to the second storage device; and
   wherein during each given time, powering off the sub-plurality of the storage devices storing the data units that are not being accessed by any workload to conserve power comprises during the same time period, powering off the first storage device, to conserve power.

3. The method of claim 2, wherein neither when the first workload is scheduled to access the first data unit nor when the second workload is scheduled to access the second data unit is modified.

4. The method of claim 2, wherein the first workload and the second workload are one of: different workloads, and a same workload.

5. The method of claim 2, further comprising:
   determining that the first storage device has worse power efficiency than the second storage device, such that the first data unit is moved from the first storage device to the second storage device, instead of the second data unit being moved from the second storage device to the first storage device, to maximally conserve power.

6. The method of claim 1:
   wherein correlating the plurality of workloads to the data units by correlating which of the workloads access which of the data units and determining when each workload accesses a data unit of the plurality of data units comprises determining that a first workload is to access a first data unit stored on a storage device during a first time period different than a second time period when a second workload is to access a second data unit stored on the storage device;
   wherein modifying one or more of when the workloads access the data units, and on which of the storage devices the data units are stored, so that at given times the data units stored on a sub-plurality of the storage devices are not being accessed by any workload comprises rescheduling the first workload to access the first data unit stored on the storage device during the second time period so that the first workload is to access the storage device during a same time period as the second workload is to access the storage device; and
   wherein during each given time, powering off the sub-plurality of the storage devices storing the data units that are not being accessed by any workload to conserve power comprises during the first time period, powering off the storage device to conserve power.

7. The method of claim 6, wherein neither the first data unit nor the second data unit is moved to a different storage unit.

8. The method of claim 6, wherein the storage device is a first storage device, and further comprising:
   determining that a third workload is to access a third data unit stored on a second storage device different than the first storage device during the second time period;
   rescheduling the third workload to access the third data unit stored on the second storage device during the first time period so that the third workload is to access the second storage device during the first time period and the first and second workloads are to access the first storage device during the second time period; and during the second time period, powering off the second storage device to conserve power.

9. The method of claim 6, wherein the storage device is a first storage device, and further comprising:

determining that the second time period is prior to the first time period and that the first workload has lower priority than the second workload, such that the first workload is rescheduled to access the first data unit stored on the storage device during the second time period, instead of the second workload being rescheduled to access the second data unit stored on the storage device during the first time period.

10. A non-transitory computer-readable data storage medium storing computer-executable code that a processor executes to:

correlate a plurality of workloads to the data units by correlating which of the workloads access which of the data units and determining when each workload accesses a data unit of the plurality of data units, wherein the data units are stored on a plurality of storage devices, each data unit stored on one of the storage devices, wherein a data unit is one of a data file and a data block of a data file;

modify one or more of when the workloads access the data units, and on which of the storage devices the data units are stored, so that at given times the data units stored on a sub-plurality of the storage devices are not being accessed by any workload; and during each given time, power off the sub-plurality of the storage devices storing the data units that are not being accessed by any workload to conserve power.

11. The non-transitory computer-readable data storage medium of claim 10:

wherein correlating the plurality of workloads to the data units with respect to which of the workloads access which of the data units, and when the workloads access the data units comprises determining that a first data unit stored on a first storage device is scheduled for access by a first workload during a same time period as a second data unit stored on a second storage device is scheduled for access by a second workload;

wherein modifying one or more of when the workloads access the data units, and on which of the storage devices the data units are stored, so that at given times the data units stored on a sub-plurality of the storage devices are not being accessed by any workload comprises moving the first data unit from the first storage device to the second storage device; and wherein during each given time, powering off the sub-plurality of the storage devices storing the data units that are not being accessed by any workload to conserve power comprises during the same time period, powering off the first storage device, to conserve power.

12. The non-transitory computer-readable data storage medium of claim 11, wherein neither when the first workload is scheduled to access the first data unit nor when the second workload is scheduled to access the second data unit is modified.

13. The non-transitory computer-readable data storage medium of claim 11, wherein the first workload and the second workload are one of: different workloads, and a same workload.

14. The non-transitory computer-readable data storage medium of claim 11, wherein the processor executes the computer-executable code to further:

determine that the first storage device has worse power efficiency than the second storage device, such that the first data unit is moved from the first storage device to the second storage device, instead of the second data unit being moved from the second storage device to the first storage device, to maximally conserve power.

15. The non-transitory computer-readable data storage medium of claim 10:

wherein correlating a plurality of workloads to the data units with respect to which of the workloads access which of the data units, and when the workloads access the data units comprises determining that a first workload is to access a first data unit stored on a storage device during a first time period different than a second time period when a second workload is to access a second data unit stored on the storage device;

wherein modifying one or more of when the workloads access the data units, and on which of the storage devices the data units are stored, so that at given times the data units stored on a sub-plurality of the storage devices are not being accessed by any workload comprises rescheduling the first workload to access the first data unit stored on the storage device during the second time period so that the first workload is to access the storage device during a same time period as the second workload is to access the storage device; and wherein during each given time, powering off the sub-plurality of the storage devices storing the data units that are not being accessed by any workload to conserve power comprises during the first time period, powering off the storage device to conserve power.

16. The non-transitory computer-readable data storage medium of claim 15, wherein neither the first data unit nor the second data unit is moved to a different storage unit.

17. The non-transitory computer-readable data storage medium of claim 15, wherein the storage device is a first storage device, and the processor executes the computer-executable code to further:

determine that a third workload is to access a third data unit stored on a second storage device different than the first storage device during the second time period;

reschedule the third workload to access the third data unit stored on the second storage device during the first time period so that the third workload is to access the second storage device during the first time period and the first and second workloads are to access the first storage device during the second time period; and during the second time period, power off the second storage device to conserve power.

18. The non-transitory computer-readable data storage medium of claim 15, wherein the storage device is a first storage device, and the processor executes the computer-executable code to further:

determine that the second time period is prior to the first time period and that the first workload has lower priority than the second workload, such that the first workload is rescheduled to access the first data unit stored on the storage device during the second time period, instead of the second workload being rescheduled to access the second data unit stored on the storage device during the first time period.

19. A system comprising:

a plurality of storage devices on which a plurality of data units are stored, each data unit stored on one of the storage devices;

a processor; and a non-transitory computer-readable data storage medium storing computer-executable code that a processor executes to:

correlate a plurality of workloads to the data units by correlating which of the workloads access which of the data units and determining when each workload accesses a data unit of the plurality of data units, wherein the data units are stored on a plurality of storage devices, each data unit stored on one of the storage devices, wherein a data unit is one of a data file and a data block of a data file;

modify one or more of when the workloads access the data units, and on which of the storage devices the data units are stored, so that at given times the data units stored on a sub-plurality of the storage devices are not being accessed by any workload; and during each given time, power off the sub-plurality of the storage devices storing the data units that are not being accessed by any workload to conserve power.

20. The system of claim 19:

wherein correlating the plurality of workloads to the data units by correlating which of the workloads access which of the data units and determining when each workload accesses a data unit of the plurality of data units comprises determining that a first data unit stored on a first storage device is scheduled for access by a first workload during a same time period as a second data unit stored on a second storage device is scheduled for access by a second workload;

wherein modifying one or more of when the workloads access the data units, and on which of the storage devices the data units are stored, so that at given times the data units stored on a sub-plurality of the storage devices are not being accessed by any workload comprises moving the first data unit from the first storage device to the second storage device; and wherein during each given time, powering off the sub-plurality of the storage devices storing the data units that are not being accessed by any workload to conserve power comprises during the same time period, powering off the first storage device, to conserve power.

\* \* \* \* \*